United States Patent [19]
Aoki

[11] Patent Number: 5,920,347
[45] Date of Patent: *Jul. 6, 1999

[54] OPTICAL COLOR SEPARATION SYSTEM UTILIZING DICHROIC MIRRORS

[75] Inventor: Harumi Aoki, Tokyo, Japan

[73] Assignee: Asahi Kogaku Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/675,159

[22] Filed: Jul. 3, 1996

[30] Foreign Application Priority Data

Jul. 4, 1995 [JP] Japan .................................. 7-169060

[51] Int. Cl.⁶ .................................................. H04N 9/07
[52] U.S. Cl. ........................... 348/339; 348/341; 359/634
[58] Field of Search ..................................... 348/336, 339, 348/337, 338, 341, 262; 359/889, 583, 634; H04N 9/097

[56] References Cited

U.S. PATENT DOCUMENTS

| | | | |
|---|---|---|---|
| 3,647,946 | 3/1972 | Enloe | 359/634 |
| 4,654,698 | 3/1987 | Langworthy | 348/339 |
| 4,757,387 | 7/1988 | Saito | 348/341 |
| 4,806,750 | 2/1989 | Vincent | 348/339 |
| 4,964,696 | 10/1990 | Suzuki et al. | 359/889 |
| 5,117,253 | 5/1992 | Suzuki et al. | 355/32 |
| 5,424,156 | 6/1995 | Aoki et al. | 430/59 |
| 5,621,460 | 4/1997 | Hatlestad et al. | 348/337 |

FOREIGN PATENT DOCUMENTS

| | | | |
|---|---|---|---|
| 01068190 | 3/1989 | Japan | H04N 9/097 |
| 1319384 | 12/1989 | Japan . | |
| 04104120 | 4/1992 | Japan | H04N 9/097 |
| 5-2280 | 1/1993 | Japan . | |
| 6167603 | 6/1994 | Japan . | |

OTHER PUBLICATIONS

"A New Bright Single Panel LC-Projection System Without Mosaic Color Filter," The Institute of Electronic Information and Communication Engineers. Technical Report of IEICE, vol. 94, No. 503, pp. 1–6 (1995)., and an English Translation.

Primary Examiner—Wendy Garber
Assistant Examiner—Jacqueline Wilson
Attorney, Agent, or Firm—Greenblum & Bernstein P.L.C.

[57] ABSTRACT

An optical color separation system which separates light incident thereupon into at least two color components. The optical color separation system includes a plurality of dichroic mirrors that are arranged nonparallel to one another and along an optical axis of the incident light to reflect different color components. The dichroic mirrors are disposed at predetermined positions so that the respective color components of the incident light are reflected toward different relay positions corresponding to the respective color components. The incident light contains at least one color component, and is incident upon and reflected by one or more subsequent dichroic mirrors behind a frontmost dichroic mirror. The incident light is also transmitted through preceding dichroic mirrors including the frontmost dichroic mirror in accordance with at least one color component. The optical color separation system also includes a plurality of reflection mirrors corresponding to the dichroic mirrors, provided at the relay positions. The reflection mirrors are disposed at predetermined positions such that the different color components reflected by the dichroic mirrors are reflected by the reflection mirrors in a manner that optical paths of the reflected lights from the respective reflection mirrors are substantially parallel.

9 Claims, 5 Drawing Sheets

OPTICAL COLOR SEPARATION SYSTEM UTILIZING DICHROIC MIRRORS

BACKGROUND OF THE INVENTION

1. Field of the Invention

The present invention relates to an optical color separation system provided in a high resolution color image pickup device, such as a still video camera or a color copier, and so forth, to prepare separate color components of an optical image of an object. The present invention also relates to a single lens reflex type of optical color separation system.

2. Description of the Related Art

In a known high resolution image pickup device, images of three primary colors, i.e., red, green and blue (R, G, B) are formed on a monochromatic recording medium, and are combined in an optical or electrical process to obtain a colored picture. In general, a known optical color separation system to prepare three primary color image components is comprised of a single prism or a plurality of prisms.

For example, an optical system disclosed in Japanese Unexamined Patent Publication No. 1-319384 is comprised of a dichroic prism and two light path forming prisms which are arranged symmetrically with respect to the optical axis of light incident upon the dichroic prism. The dichroic prism includes dichroic mirror surfaces (equivalent to dichroic mirrors) which are perpendicular to each other to reflect a red component and a blue component, respectively to separate the incident light into three primary color components R, G and B. The light path forming prisms are each provided with a total reflection surface which reflects a corresponding light component (e.g., the red or blue component) transmitted through the dichroic prism. In this optical system, a green component of the light incident upon the dichroic prism is transmitted through the two dichroic mirrors and is converged onto an image forming surface at a green image forming position thereof. The red and blue components are reflected by the respective dichroic mirrors in directions perpendicular to the optical axis of the incident light and different from one another by 180° and are thereafter reflected in a direction parallel with the optical axis due to the total reflection by the light path forming prisms. The red and blue components thus reflected pass through the corresponding light path forming prisms in a direction parallel with the optical axis of the green component. Consequently, the optical path length increases, so that the red and blue components are converged onto the image forming surface at green and red image forming positions in proximity to the green image forming position, respectively.

In Japanese Unexamined Patent Publication No. 6-167603, a three primary color separation prism is comprised of a dichroic prism and two light path forming prisms integral with the dichroic prism, which have been disclosed in Japanese Unexamined Patent Publication No. 1-319384. The color separation prism is provided therein with two total reflection surfaces to realize an identical optical path length of the color components. In other words, the green component transmitted through the two dichroic mirrors is reflected by one of the total reflection surfaces in a direction perpendicular to the optical axis of the incident light and different from the directions of reflection of the red and blue components by 90°, and is thereafter reflected by the other total reflection surface in a direction parallel with the optical axis. As a result of an increase in the optical path length of the green component, the green, red and blue images formed on the image forming surface are not aligned along a line but are arranged in a zig-zag fashion.

In the known optical system, since the optical path length within the prism is intentionally increased to adjust the optical path lengths of the color components and image forming positions thereof, the optical path length within the glass medium is increased, and the incident light is refracted. Consequently, there is a large spherical aberration caused, thus resulting in a difficulty in forming a high quality image. Moreover, if the optical path length of the green component is elongated, as in JP 6-167603 mentioned above, the green image forming position on the image forming surface is not aligned with the red image forming position or the blue image forming position, and hence, for example, the scanning operation of the image is complicated.

Also, in the conventional optical system as mentioned above, all the reflection surfaces including the dichroic mirror surface adapted to prepare separate color components and the total reflection surfaces adapted to provide the optical path for light reflected thereby are formed in the prism, the image forming positions vary depending on the machining precision of the prism. To this end, the prism must be machined at an extremely high precision, which however increases the manufacturing cost.

SUMMARY OF THE INVENTION

It is an object of the present invention to provide an inexpensive optical color separation system in which the optical path length within an optical medium, such as a glass medium can be reduced, the required precision can be lessened or relaxed, the image forming positions can be aligned along a line, and the resolution can be enhanced.

To achieve the object mentioned above, according to the present invention, there is provided an optical color separation system which separates light incident thereupon into at least two color components, comprising a plurality of dichroic mirrors that are arranged along an optical axis of the incident light to reflect different color components, the dichroic mirrors being disposed at predetermined positions so that the respective color components of the incident light are reflected toward different relay positions in the air by the dichroic mirrors corresponding to the respective color components, and so that the light, containing at least one color component, being incident upon and reflected by a subsequent dichroic mirror behind a frontmost dichroic mirror, facing (being exposed to) the incident light, is arranged to be transmitted through preceding dichroic mirrors including the frontmost dichroic mirror, through which the light containing at least one color component has already passed. Also provides a plurality of reflection mirrors corresponding to the dichroic mirrors, provided at the relay positions, where the reflection mirrors are disposed at predetermined positions whereby the different color components reflected by the dichroic mirrors are reflected by the reflection mirrors in a manner that optical paths of the reflected lights from the respective reflection mirrors are substantially parallel.

Preferably, the dichroic mirrors are made of separate optical elements to restrict the optical path length within the optical elements. Alternatively, the dichroic mirrors can be integrally formed in a single prism. In this alternative, the reflection surface of the first dichroic mirror faces the air.

It is possible to provide an optical image forming system provided in front of the dichroic mirrors to form different color components of an optical image aligned and reflected by the corresponding reflection mirrors onto a same plane at different image forming positions.

For instance, as an aspect of the present invention, an optical color separation system which separates light incident thereupon into at least three color components, comprises first, second and third dichroic mirrors that are arranged along an optical axis of the incident light to reflect different color components. The three dichroic mirrors are disposed at predetermined positions so that the respective color components of the incident light are reflected toward three different relay positions in the air by the three dichroic mirrors, and so that the light incident upon and reflected by the second dichroic mirror is arranged to be transmitted through the first dichroic mirror located in front of the second dichroic mirror, and the light incident upon and reflected by the third dichroic mirror is arranged to be transmitted through the second and the first dichroic mirrors located in front of the third dichroic mirror. Three reflection mirrors corresponding to the three dichroic are provided at the respective relay positions, such that the three reflection mirrors are disposed at predetermined positions whereby the three different color components reflected by the three dichroic mirrors are reflected by the three reflection mirrors in a manner that optical paths of the reflected lights from the respective reflection mirrors are substantially parallel.

Moreover, an optical color separation system according to the present invention can be applied to a photographing lens having a short flange back in a single lens reflex type optical system having a quick-return mirror. Namely, an optical color separation system comprises an optical image forming system, a quick-return mirror provided in rear of the optical image forming system, which is normally located in a viewing position in which the quick-return mirror is in the optical axis to make an object image incident upon an optical view finder and is moved to a retracted position in which the quick-return mirror is retracted from the optical axis upon photographing operation, and a movable dichroic mirror unit which is moved into the optical axis in association with the movement of the quick-return mirror when the quick-return mirror is moved to the retracted position, and the movable dichroic mirror unit is retracted from the optical axis when the quick-return mirror is moved to the viewing position. The movable dichroic mirror unit may include a plurality of dichroic mirrors that are arranged along the optical axis of the incident light to reflect different color components, where the dichroic mirrors are disposed at predetermined positions so that the respective color components of the incident light are reflected toward different relay positions in the air by the dichroic mirrors, and that the light incident upon and reflected by a subsequent dichroic mirror behind a frontmost dichroic mirror facing the incident light are arranged to be transmitted through preceding dichroic mirrors located in front of the subsequent dichroic mirror. A plurality of reflection mirrors corresponding to the dichroic mirrors, may be at the relay positions when the movable dichroic mirror unit is in the optical axis. In addition the reflection mirrors may be disposed at predetermined positions so that the different color components reflected by the dichroic mirrors are reflected by the reflection mirrors along substantially parallel light paths, and a monochromatic recording media which may be provided in a same plane perpendicular to the optical axes of the reflection mirrors.

The disclosure relates to the subject matter contained in Japanese patent application No. 7-169060 (filed on Jul. 4, 1995), which is expressly incorporated by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
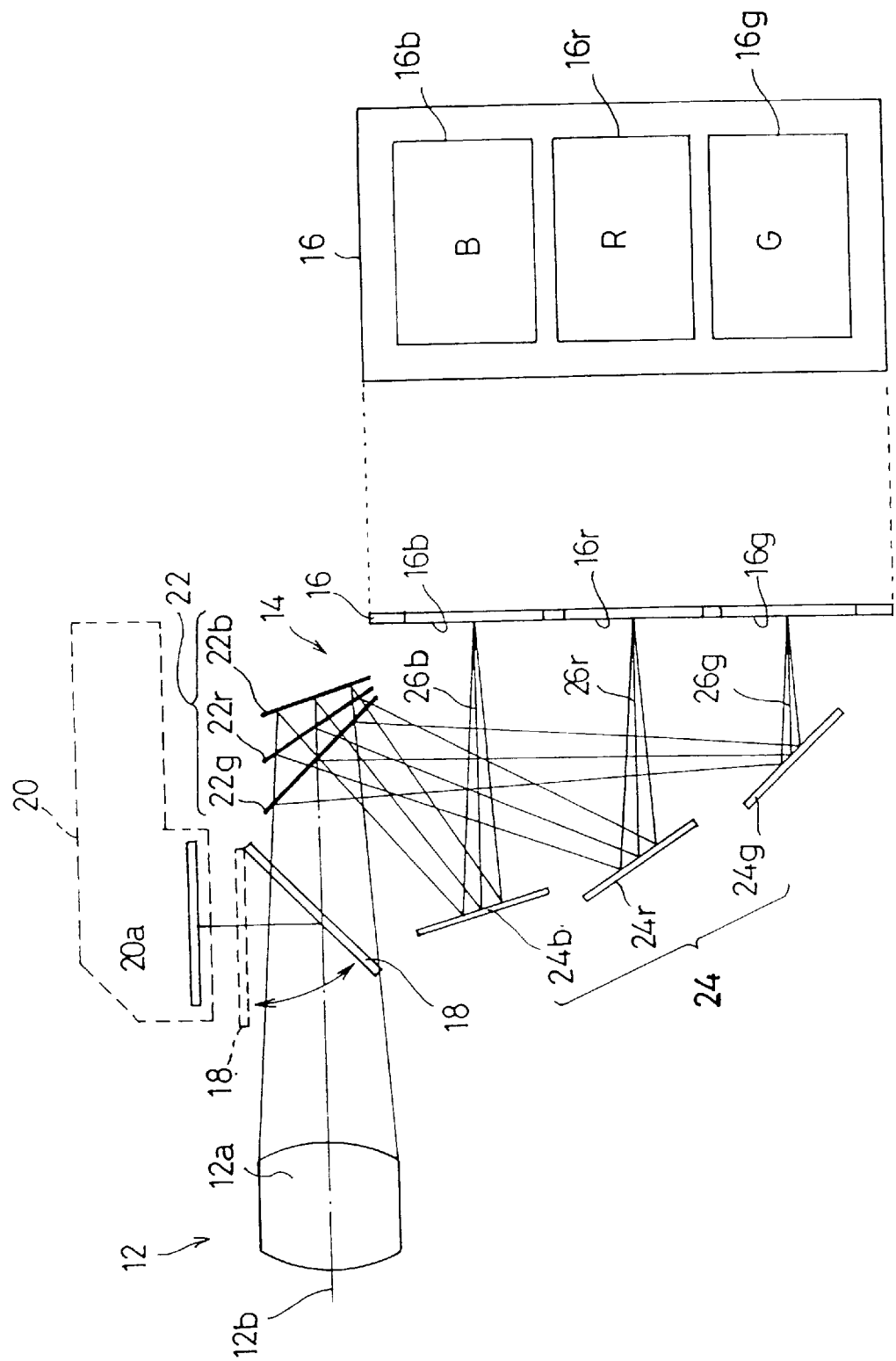
FIG. 1 is a schematic view of a still video camera having an optical color separation system, including a plan view of a recording medium, according to a first embodiment of the present invention.

In FIG. 1, a still video camera whose optical system is schematically shown in FIG. 1 is comprised of an image pickup device 12 having an image forming system 12a which is adapted to form an optical image of an object at a position in front thereof. There is an optical three-color separation system 14 at the rear of the image pickup device 12 and an electronic development type recording medium 16 at a predetermined position behind the color separation system 14. A quick-return mirror 18 is provided between the image pickup device 12 and the color separation system 14. There is a focusing plate 20a of an optical finder system 20 above the quick-return mirror 18. The quick-return mirror 18 is normally located in an inclined position (i.e., a lower position) indicated by a solid line to reflect the light transmitted through the image pickup device 12 toward the optical finder 20. Upon taking a picture, the quick-return mirror 18 is moved to a horizontal position (i.e., an upper position or retracted position) indicated by a phantom line by a system controller of the camera (not shown).

The three-color separation system 14 is comprised of an optical dichroic mirror system 22 provided behind the quick-return mirror 18 and an optical reflection mirror system 24 provided between the dichroic mirror system 22 and the electronic development type recording medium 16.

Figure 2:
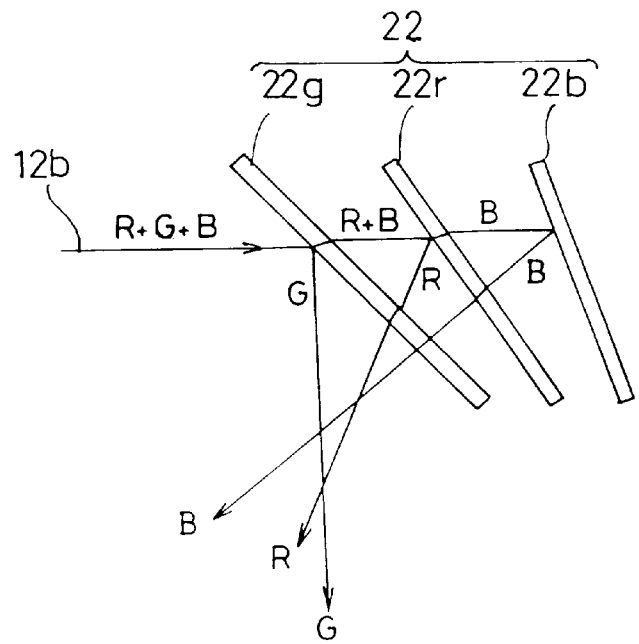
FIG. 2 is an enlarged view of a dichroic mirror used in an optical color separation system shown in FIG. 1.

The dichroic mirror system 22 separates an object image formed by the optical image forming system 12 into three primary color components of red (R), green (G) and blue (B), as can be seen in FIGS. 1 and 2. The optical system 22 is provided with three dichroic mirrors 22g, 22r and 22b arranged along the optical axis of the image forming system 12. The first dichroic mirror 22g adjacent to the image forming system 12 reflects the G component 26g of the object image transmitted through the image forming system 12 and permits the R component and the B component to pass therethrough. The second dichroic mirror 22r located behind the first dichroic mirror 22g reflects the R component 26r transmitted through the first dichroic mirror 22g and permits the B component to pass therethrough. The third dichroic mirror 22b located behind the second dichroic mirror 22r reflects the B component 26b transmitted through the first and second dichroic mirrors 22g and 22r. The dichroic mirrors 22g, 22r and 22b are inclined at predetermined angles with respect to the optical axis 12b to reflect the G, R and B components in respective directions (downward directions in FIG. 1) toward different relay positions. Also, the positions and inclination angles of the second and third dichroic mirrors 22r and 22b are determined such that the color components R and B reflected thereby pass through the dichroic mirrors located in front thereof.

The reflection mirror system 24 of the three-color separation system 14 is provided with first, second and third reflection mirrors 24g, 24r and 24b located at the respective relay positions of the B, R and G components reflected by the dichroic mirror system 22. The three reflection mirrors 24g, 24r and 24b are inclined so that the B, R and G components reflected by the dichroic mirror system 22 are reflected toward the recording medium 16 in a manner that optical paths of the reflected lights from the respective reflection mirrors 24g, 24r and 24b are substantially parallel. The reflection mirrors 24g, 24r and 24b are preferably total reflection mirrors, but may be half mirrors, so that the light passing therethrough may be used for another purpose.

The recording medium 16 is provided with three recording areas 16g, 16r and 16b for the color components G, R and B. The recording areas 16g, 16r and 16b lie in a same plane of the recording medium 16 perpendicular to the optical axis 12b. The optical image forming system (image pickup device) 12 and the three-color separation system 14 are arranged so that the color components G, R and B reflected by the reflection mirrors 24g, 24r and 24b are converged onto the respective recording areas 16g, 16r and 16b.

The three-color separation system 14 operates as follows in a photographing position in which the quick-return mirror 18 of the camera 10 is moved to the upper position and the shutter (not shown) is opened.

The G component 26g of the object image formed by the optical image forming system 12 is reflected by the first dichroic mirror 22g; reflected by the first reflection mirror 24g; and converged onto the G recording area 16g of the recording medium 16. The R component 26r is transmitted through the first dichroic mirror 22g and is reflected by the second dichroic mirror 22r. The R component 26r reflected by the second dichroic mirror 22r is transmitted again through the first dichroic mirror 22g; reflected by the second reflection mirror 24r; and converged onto the R recording area 16r of the recording medium 16. The B component 26b is transmitted through the first and second dichroic mirrors 22b and 22r and is reflected by the third dichroic mirror 22r. The B component 26b reflected by the third dichroic mirror 22b is transmitted again through the second and first dichroic mirror 22r and 22g; reflected by the third reflection mirror 24b; and converged onto the B recording area 16b of the recording medium 16.

The electronic development type recording medium 16 is activated when a predetermined amount of voltage is applied thereto, so that image data corresponding to the exposure can be electronically recorded, as disclosed in, for example, Japanese Unexamined Patent Publication No. 5-2280. The electronic development type recording medium 16 is activated in accordance with the control of the system controller at least when the shutter of the camera is opened. When the electronic development type recording medium 16 is exposed, the images of the G, R and B components are developed on the respective recording areas of the recording medium 16. The developed G, R and B images are processed through existing scanning mechanism and image processor (not shown), etc., incorporated in the camera, to obtain an electrically combined color picture. Since the G, R and B images on the recording medium 16 are aligned on the same plane, the scanning operation can be simplified.

Figure 3:
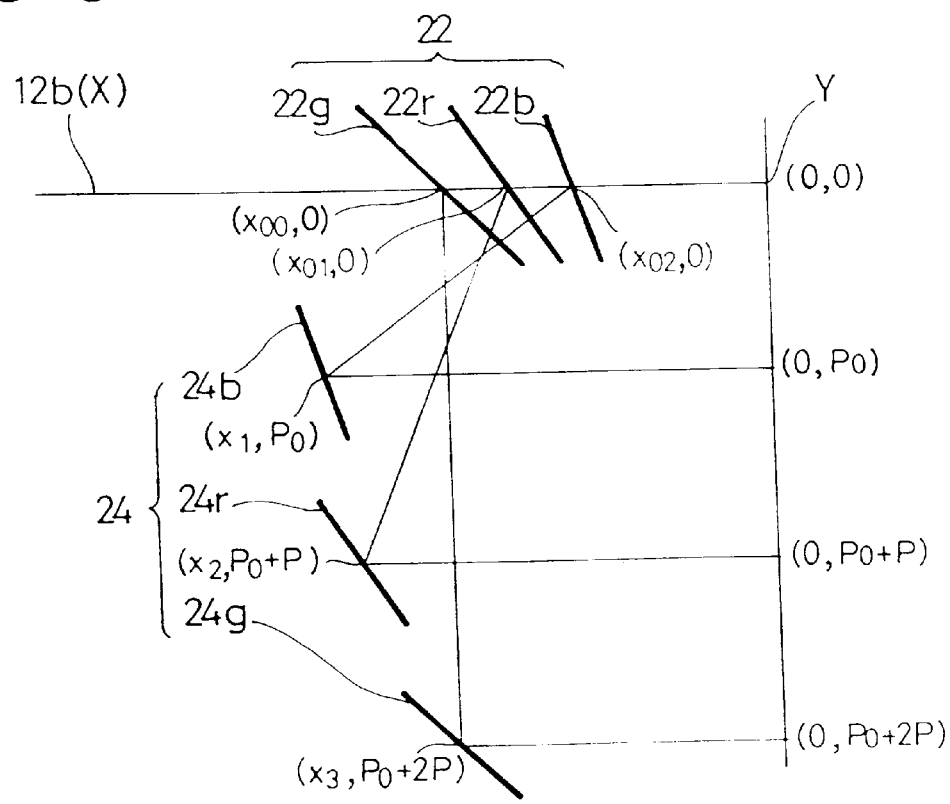
FIG. 3 is a conceptual view of an optical arrangement showing coordinates of each mirror in an optical color separation system shown in FIG. 1.

FIG. 3 shows a positional relationship of the mirrors of the three-color separation system 14. In FIG. 3, it is assumed that the optical axis of the incident light upon the optical dichroic mirror system 22 is X and the direction perpendicular to the axis X in an imaginary plane (perpendicular to the sheet of the drawing) including the G, R and B image forming areas is Y. The origin of the X-Y coordinates that corresponds to the intersection point of the axis X and the imaginary plane is (0, 0), and the intersection points of the axis X and the dichroic mirrors 22g, 22r and 22b, i.e., the coordinates of the points of the dichroic mirrors at which the G, R and B components are reflected are (Xoo, 0), (Xo1, 0), (Xo2, 0), respectively. The coordinates of the B, R and G image forming positions are (0, Po), (0, Po+P), (0, Po+2P), respectively. The coordinates of the centers of the reflection mirrors 24b, 24r and 24g at which the B, R and G image components are reflected are represented by (X1, P0), (X2, Po+P), and (X3, Po+2P), respectively, since the light paths connecting the centers of the reflection mirrors and the corresponding image forming points of the recording medium extend in parallel with the optical axis 12b. In this connection, there is the following relationship:

$$[(Xoo-X1)^2+(Po)^2]^{1/2}+|X1|=[(Xoo-X2)^2+(Po+P)^2]^{1/2}+|X1|=[(Xoo-X3)^2+(Po+2P)^2]^{1/2}+|X1|$$

The X-coordinates (Xoo, Xo1, Xo2) of the reflection points of the dichroic mirrors at which the G, R and B components are reflected and the Y-coordinates (P, Po, 2P) of the image forming positions can be determined in advance. Therefore, the X-coordinates (X1, X2, X3) of the reflection points of the reflection mirrors 24b, 24r and 24g can be obtained based on the values of Xoo, Xo1, Xo2, P, Po, 2P, using the formula (1) mentioned above.

The inclination of the reflection mirrors 24g, 24r and 24b, positions of the reflection points of which have been determined can be adjusted by the three-point method which is per se known. In this regard, the reflection mirrors 24g, 24r and 24b are preferably made of three separate or independently adjustable mirrors. If the precision of the position of the dichroic mirrors is not high, the position of the G, R and B components on the electronic development type recording medium 16 in the vertical direction Y varies. Nevertheless, if the reflection mirrors 24g, 24r and 24b can be independently adjusted, the image forming positions can be independently adjusted. It is also possible to adjust the change in the vertical position of the G, R and B components (images) by the known image processing method, upon electrically combining the colored images.

In the above-mentioned embodiment, the three-color separation system 14 does not contain a prism, unlike the prior art, and the optical elements through which the light passes are only the three independent dichroic mirrors 22b, 22r and 22g. Hence, a high quality image having reduced aberrations and an increased resolution can be obtained. The absence of a prism makes it possible to provide separate position adjusting mechanisms for the mirrors 22g, 22r, 22b and 24g, 24r and 24b, respectively. Consequently, even if the precision in the manufacture is not high, the correct image forming positions can be set by appropriately and independently adjusting the mirrors. The three dichroic mirrors 22g, 22r and 22b can be each made of a pellicle mirror or a thin-film glass substrate which is provided with a vapor-deposited dichroic film. The thickness of the glass plate of which the dichroic mirror 22g, 22r or 22b is made is determined in accordance with the resolution required for the colored picture. The resolution increases as the thickness of the glass plate decreases.

Although the dichroic mirrors 22g, 22r and 22b to reflect the G, R and B components are arranged in this order from the front in the embodiment mentioned above, the order of the arrangement is not limited thereto. It is preferable that the dichroic mirror 22g for the G component having the highest spectral luminous efficiency for an individual observer is located in the frontmost position, since the green light is free from aberration. However, it is necessary to provide a dichroic film having a band-pass filter for the G component. Since the rearmost mirror can be made of a thick mirror which can be easily made flat, it can be considered that the dichroic mirror for the G component is located in the rearmost position, in view of the flatness of the rearmost mirror and the high spectral luminous efficiency of the G component. If the dichroic mirror for the G component is the rearmost mirror, no dichroic film having the band-pass filter for the G component is necessary.

Figure 4:
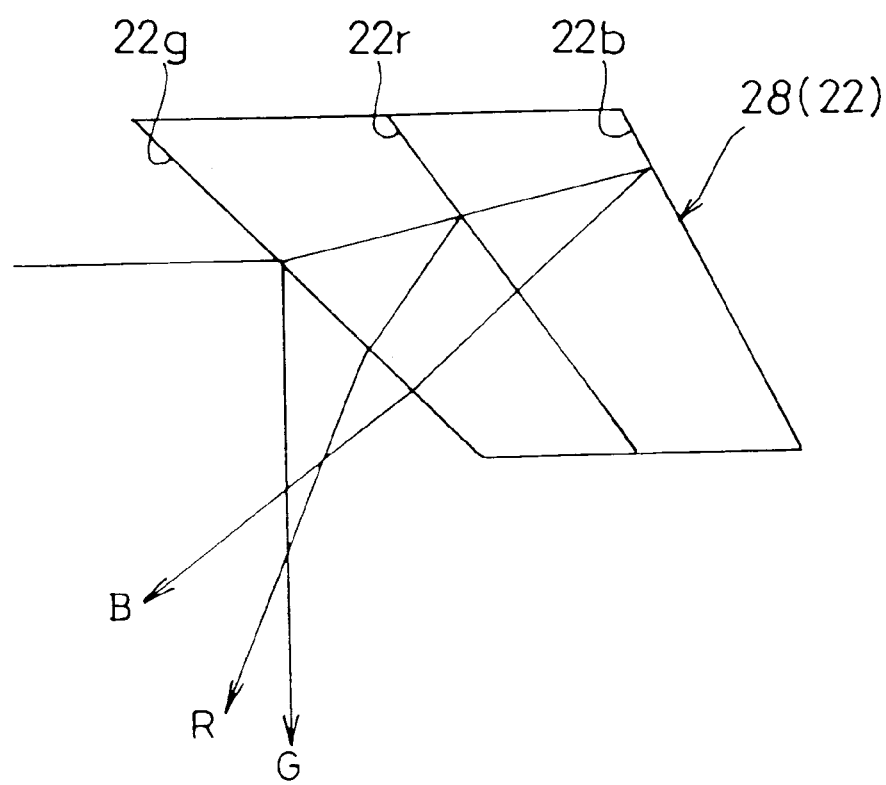
FIG. 4 is a side elevational view of a prism of an optical color separation system according to a second embodiment of the present invention.

FIG. 4 shows a second embodiment of a three-color separation system according to the present invention. The dichroic mirror system 22 is comprised of a prism 28 which is made of three dichroic mirrors 22g, 22r and 22b which are integrally formed, instead of the three independent or separate dichroic mirrors in the first embodiment. In the second embodiment, the first dichroic mirror 22g is preferably located to face the air to thereby restrict the optical path length within the prism 28, as can be seen in FIG. 4. The second embodiment can be applied to an optical color separation system in which an extremely high resolution is not required. However, in the second embodiment, since the light transmitted through the prism 28 passes through the air and reaches the recording medium 16 through the reflection mirrors, aberrations can be reduced in comparison with the prior art.

Moreover, since it is not necessary to provide a complex light path in the prism 28, the precision required for the prism is eased in comparison with the prior art, thus resulting in a reduced production cost. Furthermore, since the reflection mirror system 24 is independent from the prism 28, it is possible to mount a position adjusting mechanism to each mirror of the reflection mirror system 24.

Figure 5:
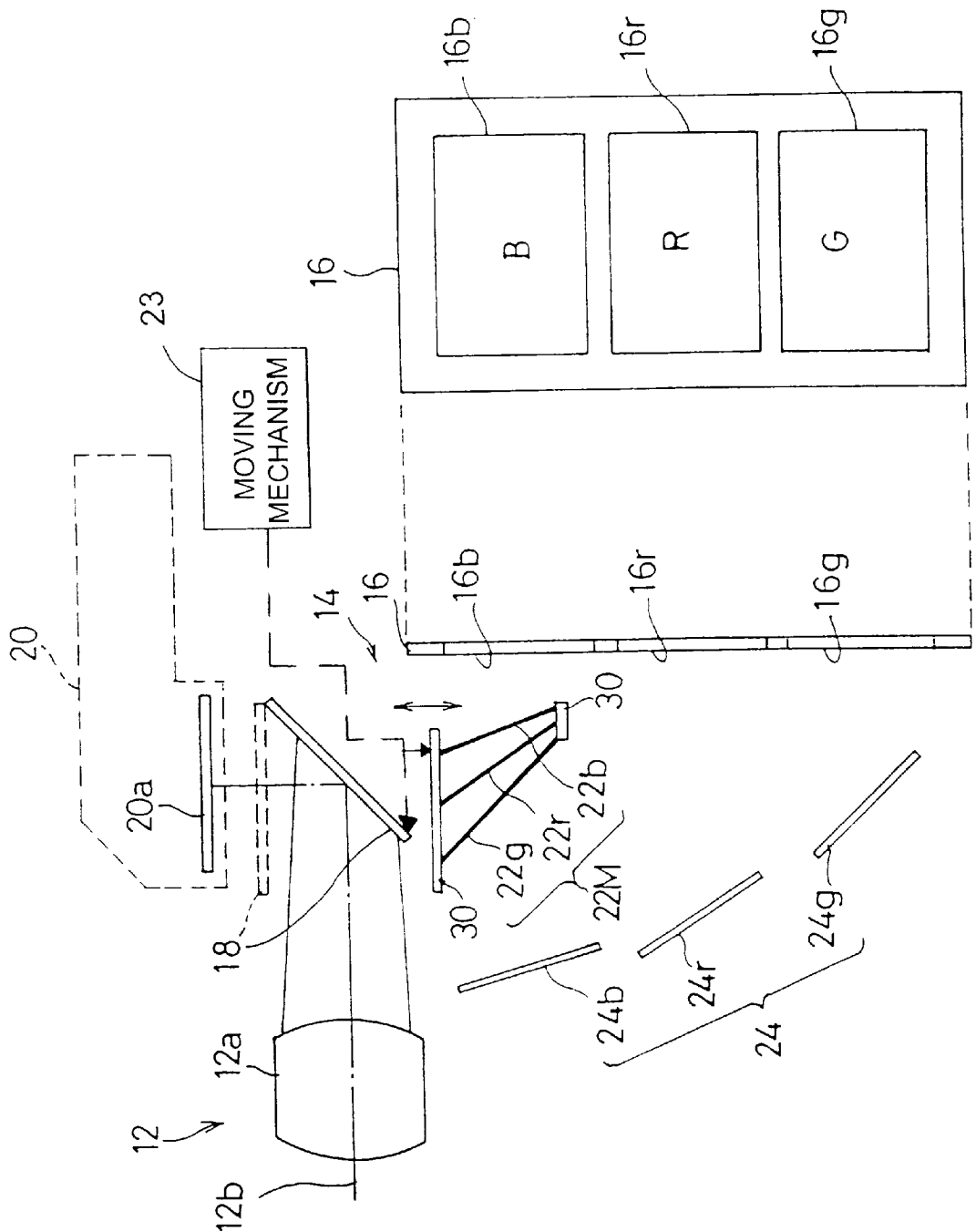
FIG. 5 is a schematic view of a single lens reflex camera in a view position, according to another embodiment of the present invention; and, FIG. 6 is a schematic view of a single lens reflex camera shown in FIG. 5, but shown in a photographing position.
Figure 6:
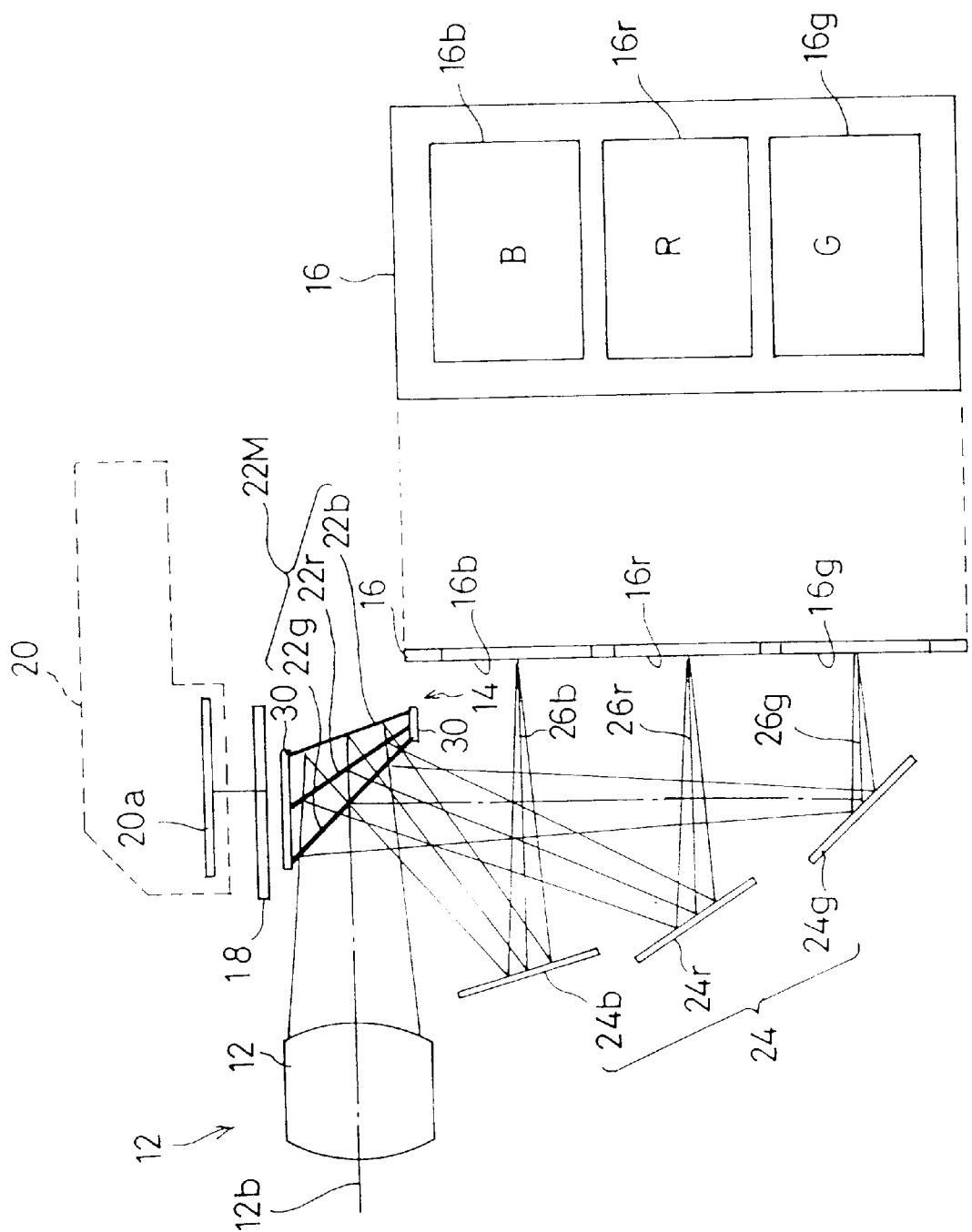

FIGS. 5 and 6 show another embodiment of the present invention, which can be advantageously applied to an image forming system 12a having a short flange back. The dichroic mirror system 22M having three dichroic mirrors 22g, 22r and 22b which are integrally secured and spaced from one another by spacers 30 is provided below the quick-return mirror 18 to move in the vertical direction in FIGS. 4 and 5. The movable dichroic mirror system 22M is movable between a retracted position (FIG. 5) in which it is retracted downward from the optical path 12b of the optical image forming system 12a and an operative position (FIG. 6) in which the dichroic mirror system 22M is located in the optical path 12b of the image forming system 12a. The movable dichroic mirror system 22M is moved in association with the operation of the quick-return mirror 18. Namely, when the quick-return mirror 18 is in the view position (i.e., an inclined or lower position) shown in FIG. 5, the movable dichroic mirror unit 22M is retracted from the optical axis 12b so as not to interfere with the quick-return mirror 18. When the quick-return mirror 18 is moved to the upper position (i.e., a horizontal position) shown in FIG. 6, the movable dichroic mirror unit 22M is moved upward together with the quick-return mirror by moving mechanism shown schematically at 23, so that the dichroic mirror unit 22M is located in the optical path 12b.

The reflection mirror system 24 having three reflection mirrors 24b, 24r and 24g is arranged such that when the movable dichroic mirror unit 22M is in the optical axis 12b, the reflection mirror system 24 constitutes the same optical system together with the movable dichroic mirror unit 22M as that shown in FIG. 1. Consequently, this embodiment can be applied to a single lens reflex camera using an image forming system 12 having a short flange back. It is possible to retract the movable dichroic mirror unit 22M in a direction perpendicular to the sheet of the drawings. It is also possible to move the reflection mirror system 24 together with the movable dichroic mirror unit 22M, but if the reflection mirror system 24 is stationary, the portion to be moved is small, thus leading to a realization of a small camera.

The above discussion has been directed to a three-color separation system, the present invention can be applied to an optical two-color separation system. In this case, two dichroic mirrors and two reflection mirrors are provided.

The present invention is not limited to the illustrated embodiments and can be modified within the or scope of the present invention as recited in the claims. For instance, although the three-color separation system is applied to a still video camera in the embodiments discussed above, the present invention can be generally applied to other type of three-color separation system or a high resolution color image pickup apparatus, such as a color copier, etc.

The reflection mirrors 24g, 24r and 24b are inclined to reflect the color components reflected by the dichroic mirror system 22 toward a recording medium along the substantially parallel light paths. The recording medium is not limited to the electronic development type recording medium 16 in which the color images are electronically combined, and can be, for example, a type in which the color images are optically combined.

As can be understood from the foregoing, according to the present invention, since the optical path length within the optical element such as a glass medium can be restricted, an optical image of high resolution having no or little aberration can be obtained. Moreover, since a prism is not necessary in the color separation system, and thus the complicated light path integrally formed therein is not necessary unlike the prior art, the precision required for the optical system in manufacture can be eased, so that the whole optical system can be made simple and inexpensive. Furthermore, according to the present invention, since the light paths of different color components are substantially parallel, the image forming positions of the color components can be aligned.

What is claimed is:

1. An optical color separation system which separates light incident thereupon into at least two color components, comprising:

a plurality of dichroic mirrors arranged nonparallel to one another and along an optical axis of said incident light to reflect different color components;

said dichroic mirrors being disposed at predetermined positions so that said respective color components of said incident light are reflected toward different relay positions by said dichroic mirrors corresponding to said respective color components, and so that said light, containing at least one color component, being incident upon and reflected by a subsequent dichroic mirror behind a frontmost dichroic mirror, facing said incident light, is arranged to be transmitted through preceding dichroic mirrors including said frontmost dichroic mirror, through which said light containing at least one color component has already passed; and, a plurality of reflection mirrors corresponding to said dichroic mirrors, provided at said relay positions;

said reflection mirrors being disposed at predetermined positions wherein said different color components reflected by said dichroic mirrors are reflected by said reflection mirrors such that optical paths of said reflected light from said respective reflection mirrors are substantially parallel, and wherein said plurality of reflection mirrors are arranged to be nonparallel to one another.

2. The optical color separation system according to claim 1, wherein said dichroic mirrors comprise separate optical elements.

3. The optical color separation system according to claim 1, wherein said dichroic mirrors are integrally formed in a prism.

4. The optical color separation system according to claim 1, further comprising an optical image forming system provided in front of said dichroic mirrors to form different color components of an optical image aligned and reflected by said corresponding reflection mirrors onto a same plane at different image forming positions.

5. An optical color separation system which separates light incident thereupon into at least three color components, comprising:

first, second and third dichroic mirrors arranged nonparallel to one another and along an optical axis of said incident light to reflect different color components;

said three dichroic mirrors being disposed at predetermined positions so that said respective color components of said incident light are reflected toward three different relay positions by said three dichroic mirrors, and so that said light incident upon and reflected by said second dichroic mirror is arranged to be transmitted through said first dichroic mirror located in front of said second dichroic mirror, and said light incident upon and reflected by said third dichroic mirror is arranged to be transmitted through said second and said first dichroic mirrors located in front of said third dichroic mirror; and, three reflection mirrors corresponding to said three dichroic mirrors, said three reflection mirrors being provided at said three different relay positions, respectively, said three reflection mirrors being disposed at predetermined positions wherein said three different color components reflected by said three dichroic mirrors are reflected by said three reflection mirrors such that optical paths of said reflected light from said respective reflection mirrors are substantially parallel, and wherein said three reflection mirrors are arranged to be nonparallel to one another.

6. An optical color separation system, comprising:

an optical image forming system having an optical axis;

a quick-return mirror provided at a rear of said optical image forming system, said quick-return mirror being located in a viewing position in which said quick-return mirror is in said optical axis to make an object image incident upon an optical view finder and is movable to a retracted position in which said quick-return mirror is retracted from said optical axis during a photographing operation;

a movable dichroic mirror unit which is moved into said optical axis in association with movement of said quick-return mirror when said quick-return mirror is moved to the retracted position, and said movable dichroic mirror unit is retracted from said optical axis when said quick-return mirror is moved to said viewing position;

said moveable dichroic mirror unit comprising a plurality of dichroic mirrors that are arranged nonparallel to one another and along said optical axis of said incident light to reflect different color components;

said dichroic mirrors being disposed at predetermined positions so that said respective color components of said incident light are reflected toward different relay positions by said dichroic mirrors, and so that said light incident upon and reflected by a subsequent dichroic mirror behind a frontmost dichroic mirror facing said incident light are arranged to be transmitted through preceding dichroic mirrors located in front of said subsequent dichroic mirror;

a plurality of reflection mirrors corresponding to said dichroic mirrors, provided at said relay positions when said movable dichroic mirror unit is in said optical axis;

said reflection mirrors being disposed at predetermined positions so that said different color components reflected by said dichroic mirrors are reflected by said reflection mirrors along substantially parallel light paths, and wherein said plurality of reflection mirrors are arranged to be nonparallel to one another; and, monochromatic recording media which are provided in a same plane perpendicular to said optical axes of said reflection mirrors.

7. The optical color separation system according to claim 1, wherein each said respective color component is reflected by a single reflection mirror of said plurality of reflection mirrors to which each said respective color component is first incident.

8. The optical color separation system according to claim 7, wherein each said respective color component is reflected by a single reflection mirror of said plurality of reflection mirrors to which each said respective color component is first incident.

9. The optical color separation system according to claim 6, wherein each said respective color component is reflected by a single reflection mirror of said plurality of reflection mirrors to which each said respective color component is first incident.

* * * * *